United States Patent Office 3,053,783
Patented Sept. 11, 1962

3,053,783
WATER SOLUBLE POLYESTERS OF BENZENE POLYCARBOXYLIC ACIDS
Ronald L. Broadhead, Park Forest, Ill., and Richard E. Van Strien, Griffith, Ind., assignors to Standard Oil Company, Chicago, Ill., a corporation of Indiana
No Drawing. Filed Sept. 19, 1958, Ser. No. 761,961
6 Claims. (Cl. 260—29.2)

This invention relates to polyester resins having a high solubility in water.

Polyester resins prepared from dicarboxylic acids and dihydroxy alcohols normally are insoluble in water or have an insignificant degree of solubility in water. These polyester resins have many and varied characteristics, dependent on the starting materials, and the range of utility would be greatly enlarged it if were possible to prepare true water solutions containing substantial amounts of the dissolved resin. To illustrate: a water soluble material affording a varnish-like or enamel-like coating on removal of the solvent and curing would be of great value to industry; such a water soluble surface coating agent would greatly improve safety conditions in commercial paint establishments. Also, waxy-type resins would find a large field of usefulness in paper coating if it were possible to utilize water solutions of such waxy-type resins.

An object of the invention is a water soluble polyester resin derived from certain benzene polycarboxylic acids and aliphatic polyols. A particular object is a water soluble polyester resin derived from benzene tricarboxylic acids or anhydrides and glycols or ether glycols. Still another object is a water soluble polyester resin suitable for use as a surface coating agent. A further object is a method of converting essentially water insoluble polyester resins into water soluble resins. Other objects will become apparent in the course of the description of the invention.

The polyester resins which are converted to water soluble resins by the method of the invention are obtained by the polyester condensation reaction of an aliphatic polyol and a benzene polycarboxylic acid containing as the only substituents, 3 or 4 carboxyl groups or the corresponding anhydrides of these acids; these materials having been reacted in a mole ratio of polyol to acid or anhydride of at least about 1 to obtain a polyester resin reaction product having an acid number in excess of about 20. This polyester condensation reaction product is converted to a material having high solubility in water by reacting this product with an alkaline reacting material; the alkaline reacting material is present in an amount sufficient to neutralize the acidity of the polyester reaction product to the point where a water soluble resin is obtained. It is preferred to carry out the water soluble resin formation reaction in warm aqueous solution of the alkaline reacting material.

The polyester condensation reaction resin intermediate for the water soluble resin, is prepared by condensing an aliphatic polyol and a benzene tri- or tetracarboxylic acid at elevated temperatures, for example, about 150–200° C., while continuously removing the water formed in the reaction. The polyester condensation reaction is well known and it is not necessary to describe it in detail herein. The benzene polycarboxylic acids and anhydrides may also be described as acidic members selected from the class consisting of benzene polycarboxylic acids containing, as the only substituents, from 3 to 4 carboxyl groups and anhydrides thereof, i.e., these are benzene tricarboxylic acids or anhydrides or benzene tetracarboxylic acids and anhydrides. The individual members of the defined class of benzene carboxylic acids are trimellitic acid, trimellitic anhydride, trimesic acid, hemimellitic acid, hemimellitic anhydride, pyromellitic acid, pyromellitic acid-anhydride, pyromellitic dianhydride, mellophanic acid, mellophanic anhydride, prehnitic acid, prehnitic anhydrides and prehnitic dianhydride.

Trimellitic anhydride is a preferred acidic member.

The reaction requires the presence of an aliphatic polyol containing two or more hydroxy groups. Any of the well-known aliphatic polyols may be used such as alkylene glycols, alkylene ether glycols, glycerol, tetrahydroxy alcohols, and hexahydroxy alcohols. Examples of suitable aliphatic polyols are ethylene glycol, propylene glycol, hexamethylene glycol, diethylene glycol, triethylene glycol, glycerol, trimethylol-propane, erythritol, pentaerythritol, dipentaerythritol, mannitol, and sorbitol. The alkylene glycols and alkylene ether glycols are particularly suitable polyols.

In addition to the defined benzene polycarboxylic acids and the defined aliphatic polyols, the polyester condensation reaction resin may include an aliphatic monohydroxy alcohol. The aliphatic monohydroxy alcohols include, by way of example, methyl alcohol, butyl alcohol, hexyl alcohol, stearyl alcohol, allyl alcohol, and oleyl alcohol. In addition to the individual compounds, mixtures of these monohydroxy alcohols may be used. The mixtures obtained from the oxoation of a mixture of olefins are particularly suitable. Such mixtures of Oxo alcohols are now available commercially and are known as isooctyl alcohol, nonyl alcohol, isodecyl, and isotridecyl alcohol.

The polyester condensation reaction product may be obtained by using individual acid or anhydride and individual polyol, (and individual monohydroxy alcohol) or a mixture of acids or polyols (or monohydroxy alcohols) may be used.

The polyester condensation reaction product is made using a mole ratio of the defined polyol to the defined benzene polycarboxylic acid of at least about 1; more usually this ratio is between 1 and 2. When operating with glycol and trimellitic anhydride, it is preferred to use a mole ratio of glycol to anhydride between about 1.2 and 1.5.

When a monohydroxy alcohol is also present, it is desirable to have a mole ratio of defined polyol to monohydroxy alcohol between 1 and 5. It is to be understood that the amount of monohydroxy alcohol may be less than this amount or more than this amount, dependent upon the desired characteristics of the final product.

The polyester condensation reaction product is prepared under conditions of reaction such that the resin has an acid number of at least about 20. It is to be understood that not all combinations of the defined reactants can produce an acid number as low as this. In general, the acid number of the polyester resin will be between about 20 and 300. The polyester resins may range from viscous liquids to hard solids, which materials are soluble in oxygenated solvents such as alcohols and ketones.

The water soluble polyester resin of the invention consists essentially of the resin product of the reaction of the polyester condensation reaction product resin and an alkaline reacting material. The reaction is carried on until enough of the acidity of the polyester resin is utilized to obtain a water soluble resin product. The degree of "neutralization" of the polyester resin required to impart solubility is dependent upon the type of polyester resin. In general, the higher polyols and particularly the alkylene ether glycols require the least degree of "neutralization." (It is to be understood that "neutralization" represents a reduction in acid number of the polyester resin.) The usage of alkaline reacting material may be beyond that needed to obtain the water soluble resin; in general, the usage is held to not more than the amount theoretically needed to react with all the acidity of the polyester resin. The water solution of water soluble resin may be on the alkaline side; however, it is preferred to maintain the solution on the acid side or neutral. The water solution of the water soluble resin obtained by neutralizing on the order of 90% of the acidity of the polyester resin is particularly suitable for surface coating applications. Usually, at least about 60% of the acidity of the polyester resin is needed to be neutralized in order to obtain high water solubility, as evidenced by the clarity of the aqueous solution. In general, the lower the acid number of the polyester resin, the greater the percentage of the acidity of that polyester resin, which must be neutralized to obtain the desired water solubility. To illustrate: a polyester resin made from trimellitic anhydride and ethylene glycol to an acid number of about 200 can be made water soluble by reacting about 60% of the acidity with aqueous ammonium hydroxide. On the other hand, a polyester resin from these reactants made to an acid number of about 50, will require neutralizing about 90% of the acidity to obtain high water solubility.

The alkaline reacting material may be any material which reacts with acidity to produce a more neutral product. Ammonium hydroxide and alkali metal hydroxides are particularly suitable when aqueous reaction medium is desired. The hydrocarbon amines, particularly those containing not more than 4 carbon atoms in each aliphatic group, are suitable. The amino alcohols, such as alkanolamines, are suitable. The heteramines, such as morpholine, pyridine, and piperdine may be used. The type of alkaline reacting material used is determined in part by the characteristics desired in the final water soluble resin; also, by the type of polyester resin which is to be converted to a water soluble form.

The neutralization reaction is carried out by contacting the polyester resin and the alkaline reacting medium, when necessary in the presence of a liquid reaction medium; particularly suitable reaction mediums are oxygenated organic solvents for the resin and water. When water is used as the liquid reaction medium, it is preferred that it be warm, i.e., maintained in the region of 40–60° C.; the polyester resin is added to the aqueous alkaline reacting material and the two agitated until the polyester resin has passed into solution. Ammonium hydroxide solution (usually containing about 28% ammonium hydroxide) is a particularly suitable aqueous alkaline medium. The water solutions of the water soluble resin are clear liquids or clear liquids containing some opalescent appearance; the solutions may be colorless or colored, depending on the particular water soluble resin present.

For surface coating applications particularly an amino resin such as melamine-formaldehyde or urea-formaldehyde, is sometimes helpful. The water soluble amino resins are preferred when a completely water soluble system is wanted. The water solution may be formed by dissolving the water soluble resin itself, and the particular amino resin. When a completely soluble solution system is wanted, a particularly suitable method uses a water soluble amino resin in water as the alkaline reacting medium for reaction with the polyester resin to form a water soluble resin containing amino resin groups as an integral part of the molecule.

The method of the invention and species of water soluble polyester resins obtainable by the invention are illustrated by the following working examples.

Example 1

Ethylene glycol was heated in a stirred flask to 120° C. Trimellitic anhydride was added over a 20 minute period. The mole ratio of glycol to anhydride was 1.2. The contents of the flask were raised to 165° C. and held there for about 2 hours when a clear homogeneous liquid was obtained. The polyester product had an acid number (mg. KOH/ gm.) of 225. Ten grams of the solid polyester was stirred with 90 ml. of water and 3 ml. of 28% ammonium hydroxide at 50° C. until all the solid dissolved. The amount of ammonium hydroxide used produced an alkaline solution of the resin product. A film of the water solution was placed on a glass plate and baked at 140–150° C. for 2 hours. The baked film was very hard and resisted water spotting.

Example 2

Neopentyl glycol was heated in a stirred flask to 130° C. Trimellitic anhydride was added over a 10 minute period. These two were heated for 30 minutes at 160° C.; then isooctyl alcohol was added. The three reactants were cooked for about 3 hours at about 160° C. The usage of these materials was neopentyl glycol, 63 g. (0.6 mole); trimellitic anhydride, 96 g. (0.5 mole) and isooctyl alcohol, 39 g. (0.3 mole). The acid number of the polyester resin was 150.

Ten grams of the polyester was reached with 1.6 g. of 2-amino-2-methyl-1-propanol (70% of the theoretical amount needed to completely neutralize the polyester) in 90 ml. of warm water (about 50° C.). A clear pale-yellow solution was obtained. A film of the water solution on a glass plate produced a hard coating after 3 hours at 140°–150° C. A film baked on a steel sheet was hard and flexible; the sheet could be bent around a steel rod without cracking the film.

Example 3

Diethylene glycol was heated to 130° C. Trimellitic anhydride was added over a 10 minute period. The two were heated, with stirring for 30 minutes. Isooctyl alcohol was added and the charge cooked for 3 hours at 165–175° C. The charge was diethylene glycol, 64 g.; trimellitic anhydride, 96 g., and isooctyl alcohol, 39 g. The polyester resin was a clear, pale-yellow solid and had an acid number of 155. Ten grams of the polyester resin was reacted with 2.4 grams of tris-hydroxymethyl aminomethane in 90 ml. of warm water (75% of the theoretical neutralization amount) to form a clear solution. After 2 hours at 140–150° C., a hard coating was obtained from a film of solution placed on a glass plate.

Example 4

Neopentyl glycol was heated to 131° C. Trimellitic anhydride was added over a 10 minute period. The materials were held at 162–168° C. for about 2 hours; the polyester resin was a clear, pale-yellow, hard, brittle solid with an acid number of 176. Five grams of the solid were reacted with 1.5 grams of triethanolamine in 95 ml. of water at a temperature of about 50° C. to form a clear water solution. A film of the water solution on a glass plate produced a hard film after 1 hour at 150° C.

Thus having described the invention, what is claimed is:

1. An aqueous solution of resinous reaction product of reactants consisting essentially of (A) the polyester condensation reaction resin of an aliphatic polyol selected from the class consisting of alkylene glycols and alkylene ether glycols and an acidic member selected from the class consisting of benzene polycarboxylic acids containing, as the only substituents, 3 carboxyl groups and anhydrides thereof, in a mole ratio of said polyol to said acidic member of between about 1.2 and 1.5, said reaction product having an acid number between about 20 and 300, the resin of A being treated with (B) an alkaline reacting material selected from the class consisting of ammonium hydroxide and amine in an amount between about 60% and 100% of that needed to neutralize the acidity of said resin A, said usage in general being greater, in percentage, the lower the acid number of said resin A, said treating being carried out in a water medium whereby an aqueous solution of resinous reaction product of A and B is obtained.

2. The solution of claim 1 wherein said acidic member is trimellitic anhydride.

3. The solution of claim 1 wherein the usage of said alkaline reacting material is about 90% of that needed to neutralize the acidity of said reaction product.

4. An aqueous solution of a polyester-type resin consisting of the resin product of (I) the polyester condensation reaction product of reactants (i) a glycol selected from the class consisting of alkylene glycols and alkylene ether glycols, (ii) an aliphatic monohydroxy alcohol and (iii) an acidic member selected from the class consisting of benzene tricarboxylic acids, containing carboxyl groups as the only substituents, and anhydrides thereof, in a mole ratio of glycol to acidic member of between about 1.2 and 1.5, and in a mole ratio of said glycol to said alcohol of between 1 and 5, said reaction product having an acid number between about 20 and 300, and (II) an alkaline reacting material selected from the class consisting of ammonium hydroxide and amine in an amount such that between about 60% and 100% of the acidity of said reaction product I is neutralized to obtain a water soluble resin product, said percentage of neutralization being greater as the acid number of said reaction product I approaches the lower limit of said range of about 20–300, said treating being carried out in a water medium whereby an aqueous solution of the resinous reaction product of I and II is obtained.

5. A water solution of a resin consisting of the reaction product of (a) ethylene glycol and trimellitic anhydride, in a mole ratio of glycol to anhydride of 1.2, reacted under polyester condensation conditions to obtain a polyester product having an acid number of about 225 and (b) aqueous ammonium hydroxide at about 50° C., in an amount slightly in excess of that required to neutralize said polyester product, whereby a water solution of the resin product of "a" and "b" is obtained.

6. A water solution of a resin consisting of the reaction product of (a) neopentyl glycol, trimellitic anhydride and isooctyl alcohol, in a mole ratio of glycol: anhydride: alcohol of 1.2:1:0.6, reacted under polyester condensation conditions to obtain a polyester product having an acid number of about 150 and (b) 2-amino-2-methyl-1-propanol, in warm aqueous solution, in an amount sufficient to neutralize about 70% of the acidity of said polyester product, whereby a water solution of the resin product of "a" and "b" is obtained.

References Cited in the file of this patent
UNITED STATES PATENTS

| | | |
|---|---|---|
| 1,998,744 | Ubben | Apr. 23, 1935 |
| 2,048,778 | Brubaker et al. | July 28, 1936 |
| 2,562,878 | Blair | Aug. 7, 1951 |